United States Patent [19]
Proctor

[11] Patent Number: 5,158,809
[45] Date of Patent: Oct. 27, 1992

[54] COMBINATION GREETING CARD AND SEED GERMINATION CONTAINER

[76] Inventor: Larry K. Proctor, 113 Manchester Dr., Marietta, Ohio 45750

[21] Appl. No.: 630,583

[22] Filed: Dec. 20, 1990

[51] Int. Cl.⁵ .............................................. A47G 7/00
[52] U.S. Cl. ........................................ 428/23; 47/84; 206/423; 229/92.8
[58] Field of Search ............................ 47/84; 206/423; 229/92.8; 428/7-23

[56] References Cited
U.S. PATENT DOCUMENTS 4,418,497 12/1983 Mastriano ...................... 206/423 X
4,584,213 4/1986 Rentowl ................................ 428/23
4,917,240 4/1990 Roberts et al. ................... 428/23 X Primary Examiner—Henry F. Epstein
Attorney, Agent, or Firm—John L. Gray

[57] ABSTRACT

A combination greeting card and seed germination container which is suitable for mailing and contains a suitable greeting but when one side is removed the remaining portion can be utilized as a seed bed by moistening the growing medium contained in the container and placing seeds also contained in the container therein, which within a normal period of time will sprout and produce flowers.

4 Claims, 3 Drawing Sheets

U.S. Patent     Oct. 27, 1992     Sheet 1 of 3     5,158,809
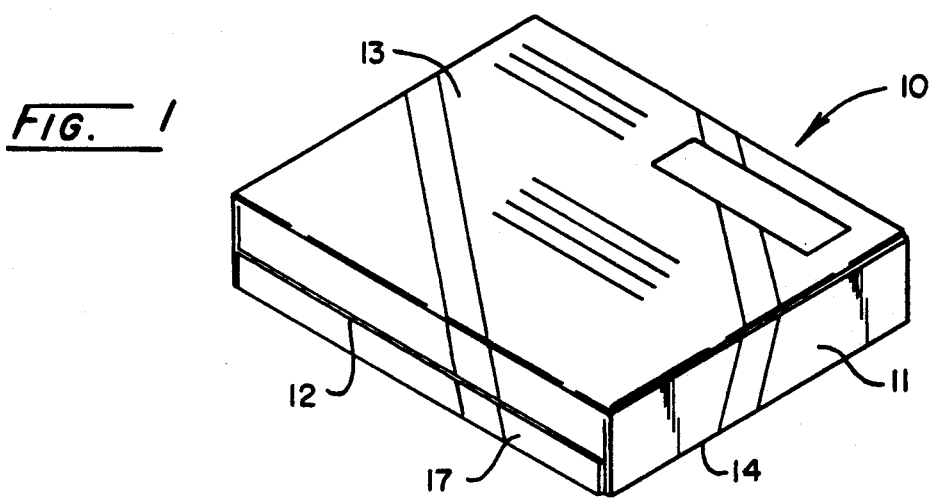
FIG. 1
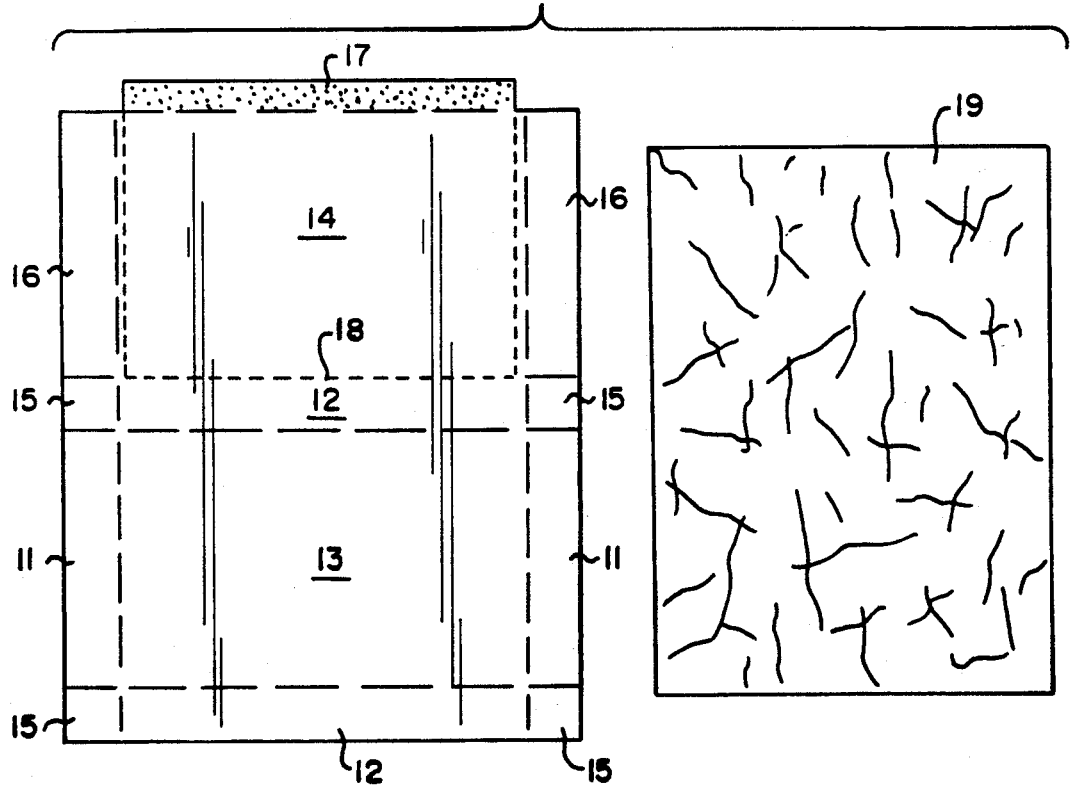
FIG. 2
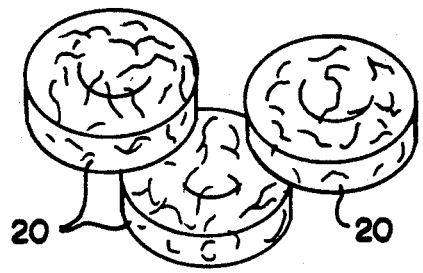
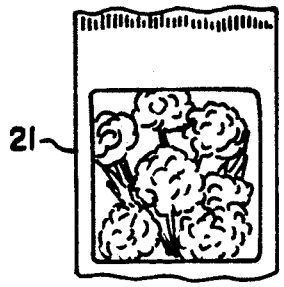

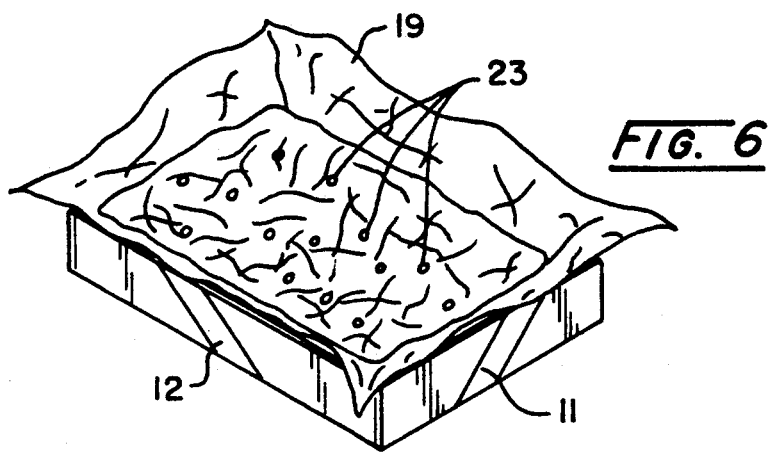
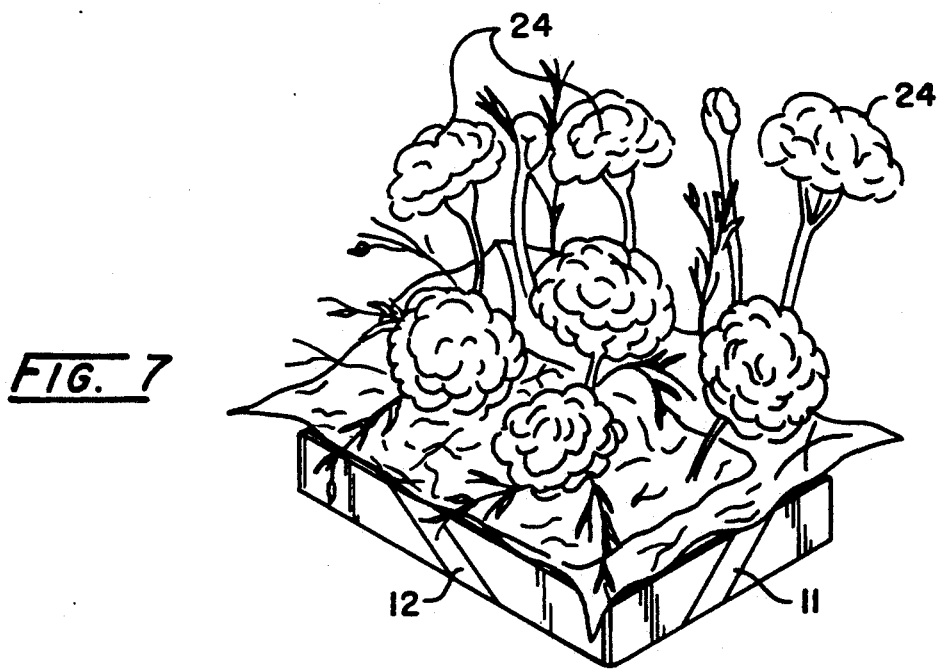

COMBINATION GREETING CARD AND SEED GERMINATION CONTAINER

BACKGROUND OF THE INVENTION

Combination greeting cards and seed germination boxes are known in the prior art and have taken a variety of forms. U.S. Pat. No. 4,418,497, Mastriano, shows one that can be used as a hanging ornament. U.S. Pat. No. 2,039,442, Mulford, shows a box for the handling of planted seeds. U.S. Pat. No. 4,917,240, Roberts, et al., shows a greeting card which has a waterproof layer and can hold flowers therein. None of these examples of the prior art disclose a greeting card which may be converted into a seed germination bed from which will spring flowers following the normal germination period.

SUMMARY OF INVENTION

A combination greeting card and seed germination container which is suitable for mailing and contains an appropriate customized or personalized greeting, is disclosed. Moreover, when one side of the container is removed the remaining portion can be utilized as a seed bed by moistening the growing medium contained in the container and placing seeds also contained in the container therein, which within a normal period of time will sprout and produce flowers. The term seed as used herein, in addition to including seeds of all varieties, is intended to include bulbs of all varieties.

Therefore, an object an of this invention is to provide a combination greeting card and seed germination container which is mailable.

It is a further object of this invention to provide such a container which has all of the necessary ingredients contained therein in order to produce growing flowers associated with the greeting.

It is a still further object of this invention to provide such a container which is capable of resisting the penetration of moisture therethrough when the source of the moisture is in the interior of the container.

These, together with other objects and advantages of the invention will become more readily apparent to those skilled in the art when the following general statements and descriptions are read in the light of the appended drawings.

BRIEF DESCRIPTION OF THE DRAWINGS

FIG. 1 shows applicant's combination greeting card and seed germination container in condition to be mailed.

FIG. 2 shows one version of applicant's container and ingredients disassembled.

FIG. 6 shows the seed bed with seeds therein.

FIG. 7 shows the final result.

DETAILED DESCRIPTION OF THE INVENTION

Figure 4:
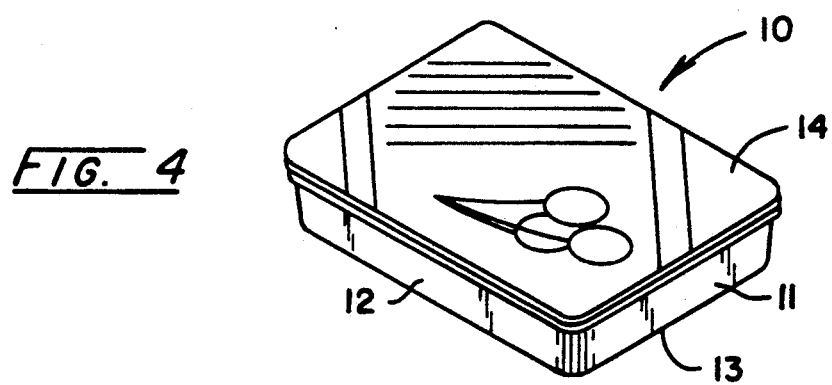
FIG. 4 shows another version of applicant's combination greeting card and seed germination container in condition to be mailed when the base material has been made from an extruded plastic.

Referring now more particularly to FIG. 1, the combination greeting card and seed germination container is shown generally at 10 and is in the form of a flat receptacle having opposite sides 11—11 and 12—12 and a base 13 fixedly attached to sides 11—11 and 12—12 and an opposite top cover 14 removably attached to sides 11—11 and 12—12. This container may be assembled in the form shown in FIG. 2 or it may be made of an injection molded plastic base comprising the sides 11—11, 12—12, and the bottom base 13 with an appropriate top cover 14 of light cardboard attached thereto as shown in FIG. 4. The bottom 13 is designed to contain the addressee's address, the sender's return address, and to receive suitable stamps. The top cover 14 of the container is adapted to have applied thereto any one of a number of all occasion, peel and place greetings which will be provided at the time the container is purchased and there will also be room for a suitable personalized written greeting. In the case of a container assembled in accordance with FIG. 2, this greeting may be written directly on the cardboard. In the case of a plastic container the message and materials would be attached by an adhesive.

Referring now more particularly to FIG. 2, the version of the combination greeting card and seed germination unit shown at 10 is shown as a cardboard flat prior to assembly. When members 12—12 and 11—11 are folded along the larger dashed lines, portions 15—15 are folded inside and adhesively connected to the corresponding portions 11—11. The top cover 14 and associated interior sides 16—16 are then folded over with the sides 16—16 being inside the sides 11—11 and the upper portion 17 adhesively attached to the outer portion of the side 12 which it engages. The top cover 14 may be readily removed along the perforated portion 18. Portion 17 is sealed onto the outer portion of member 12, a waterproof lining material 19 is placed inside the interior of the combination greeting card and seed germination container 10 along with the expandable growing media 20—20 which is normally in the form of compressed peat moss wafers. Also included in the container is a package of seeds 21. Alternatively, the filling may be accomplished from one of the ends 11, in which case one of the ends 11 would be left open and the portion 17 would be sealed onto the outer portion of member 12. After insertion of the waterproof lining material 19, the expandable growing media 20—20, and the package of seeds 21 in the open end, the member 11 then would be closed and sealed.

While the expandable growing media is shown in the form of separate compressed peat moss wafers, it is to be understood that in some instances these will be in the form of one or more oblong blocks. Furthermore, in some versions of this invention, rather than having the seeds being provided in a packet 21, they may be intermixed in or adhered to the compressed peat moss wafer or block.

Figure 3:
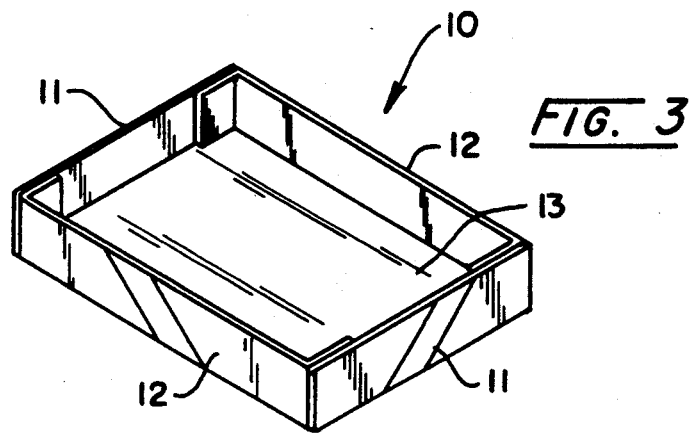
FIG. 3 shows the container of FIG. 2 when the cover has been removed therefrom.

Referring now more particularly to FIG. 3, the container shown generally at 10 has the top cover 14 removed therefrom, leaving behind a substantially flat oblong receptacle. The container shown generally at 10 may be made from injection molded plastic as shown in FIG. 4 (with the top 14 still attached) or made of cardboard as shown in FIG. 3.

Figure 5:
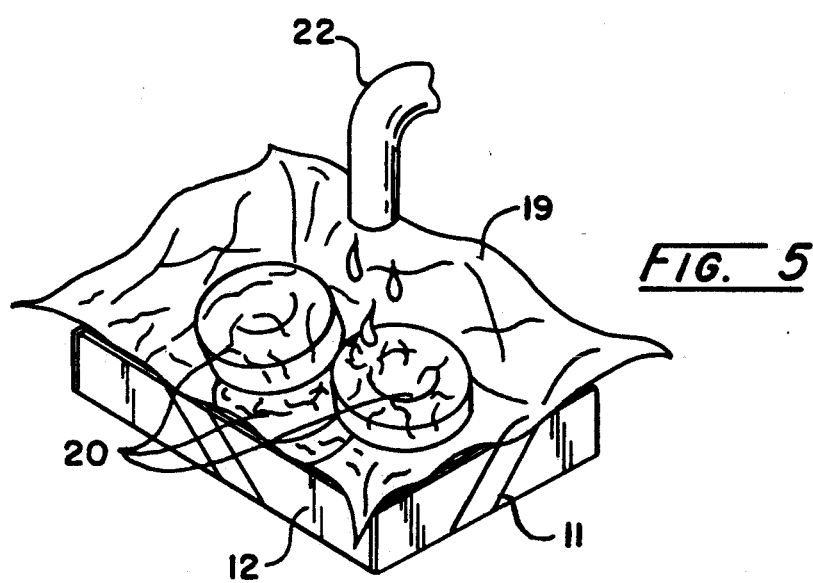
FIG. 5 shows the growing medium which is being moistened.

Referring now more particularly to FIG. 5, if the cardboard container of FIG. 3 is used, the foil liner 19 is placed therein as well as the compressed wafers 20 of peat moss and they are moistened merely by placing under a water faucet 22. Of course, if the container is plastic, the same procedure is followed but the waterproof liner is not needed.

Referring now more particularly to FIG. 6, the seeds 23—23 are shown having been placed in the peat moss pellets 20 which have expanded upon the application of water and the seeds are uniformly distributed in the seedbed.

Referring now more particularly to FIG. 7, in about four weeks or whatever the normal germination time is for the seeds in question after they have been placed in a sunny location, lovely flowers 24—24 are produced commemorating the occasion of the greeting.

It will be thus seen that applicant has provided a combination greeting card and seed germination container which upon receipt by the recipient may be activated to produce lovely growing flowers.

While this invention has been described in its preferred embodiment, it is to be appreciated that variations therefrom may be made without departing from the true scope and spirit of the invention.

What is claimed:

1. A combination greeting card and seed germination container comprising:
    a hollow receptacle having two oppositely disposed spaced parallel sides, separated by at least one side, said parallel sides and said at least one side together forming an enclosure, said parallel sides being substantially larger than said at least one side, and of a size and shape suitable for mailing,
    one of the parallel sides of said receptacle being adapted to have a greeting placed thereon,
    the other of said parallel sides of said receptacle being adapted to have an address placed thereon,
    said receptacle being so constructed that one of said parallel sides may be readily removed from the remaining portion of said receptacle with the remaining portion of said receptacle being capable of resisting the penetration of moisture therethrough when the source of said moisture is inside said receptacle, thus forming a low flat open tray in which to germinate and grow appropriate flora which can be readily displayed and enjoyed,
    said receptacle containing seeds and a seed growing medium characterized by being expandable upon exposure to moisture.

2. The combination greeting card and seed germination container of claim 1 wherein said receptacle contains a waterproof lining material adapted to form an inner waterproof liner for the remaining portion of said receptacle when said one side has been removed, whereby the remaining portion of said receptacle is made capable of resisting the penetration of moisture therethrough.

3. The combination greeting card and seed germination container of claim 1 wherein said seeds and said seed growing medium are combined.

4. The combination greeting card and seed germination container of claim 2 wherein said seeds and said seed growing medium are combined.

* * * * *